United States Patent [19]
Lavinder

[11] Patent Number: 5,743,163
[45] Date of Patent: Apr. 28, 1998

[54] CLEAN CUTTING CIRCULAR SAW BLADE

[76] Inventor: Edward E. Lavinder, P.O. Box 66, Oxford, Ark. 72565

[21] Appl. No.: 447,983

[22] Filed: May 23, 1995

[51] Int. Cl.$^6$ .................................................. B27B 33/08
[52] U.S. Cl. .................................................. 83/851; 83/835
[58] Field of Search ........................... 83/851, 846, 852, 83/835

[56] References Cited

U.S. PATENT DOCUMENTS

| | | | |
|---|---|---|---|
| 23,330 | 3/1859 | Wilson | 83/851 |
| 493,934 | 3/1893 | Lykke | 83/851 |
| 754,134 | 3/1904 | Granberg | 83/851 |
| 3,176,732 | 4/1965 | Henderson | 83/852 |
| 3,309,756 | 3/1967 | Segal | 83/851 |
| 3,619,880 | 11/1971 | Pahlitzsch | 83/835 |
| 4,011,783 | 3/1977 | Mobley | 83/846 |
| 4,173,914 | 11/1979 | Vollmer et al. | 83/835 |
| 4,784,033 | 11/1988 | Hayden et al. | 83/835 |
| 5,501,129 | 3/1996 | Armstrong et al. | 83/852 |

FOREIGN PATENT DOCUMENTS

| | | | |
|---|---|---|---|
| 273866 | 7/1927 | United Kingdom | 83/852 |

OTHER PUBLICATIONS

Western Saw Manufactures, Inc. publication, Nov. 1953.

Primary Examiner—Kenneth E. Peterson
Assistant Examiner—Sean A. Pryor
Attorney, Agent, or Firm—Mark C. Jacobs

[57] ABSTRACT

A circular saw blade having a plurality of spaced sets of teeth, each set including a first forward ripper tooth and a second rearward cleaner tooth. The top surface of each member of the pair is slanted in an opposite direction, while the ripper tooth of each pair is preferably partially chamfered on its two front edges. Each member of the pair has its two side surfaces tapering inwardly toward its respective rear surface. The cutting face of the ripper tooth is longer than the cutting face of the associated respective cleaner tooth. Each ripper tooth is preferably spaced about 15 degrees around the outer periphery of the blade from the next adjacent ripper tooth, while each associated cleaner tooth is located about 5 degrees behind the respective ripper tooth. In this manner, a single blade may be used as an all-purpose cutting blade to make clean cuts in various media without splintering.

6 Claims, 4 Drawing Sheets

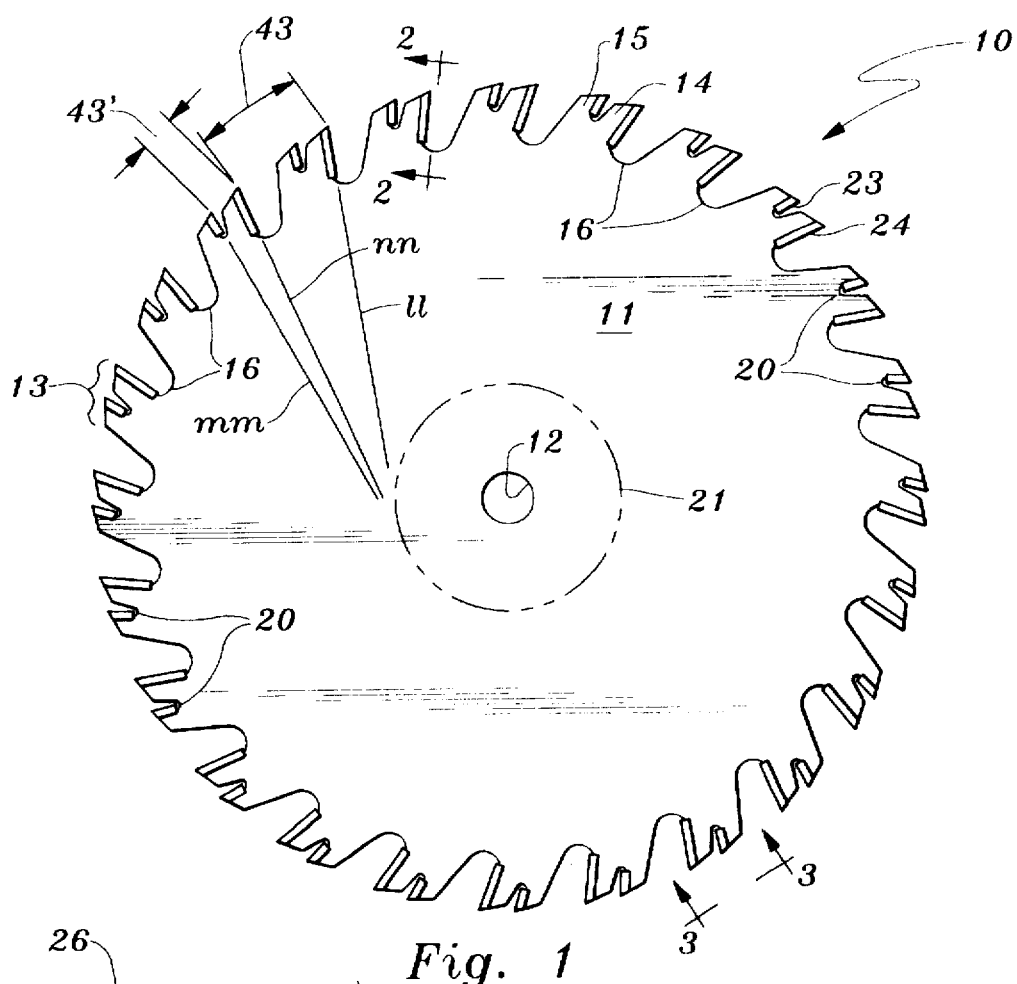
Fig. 1
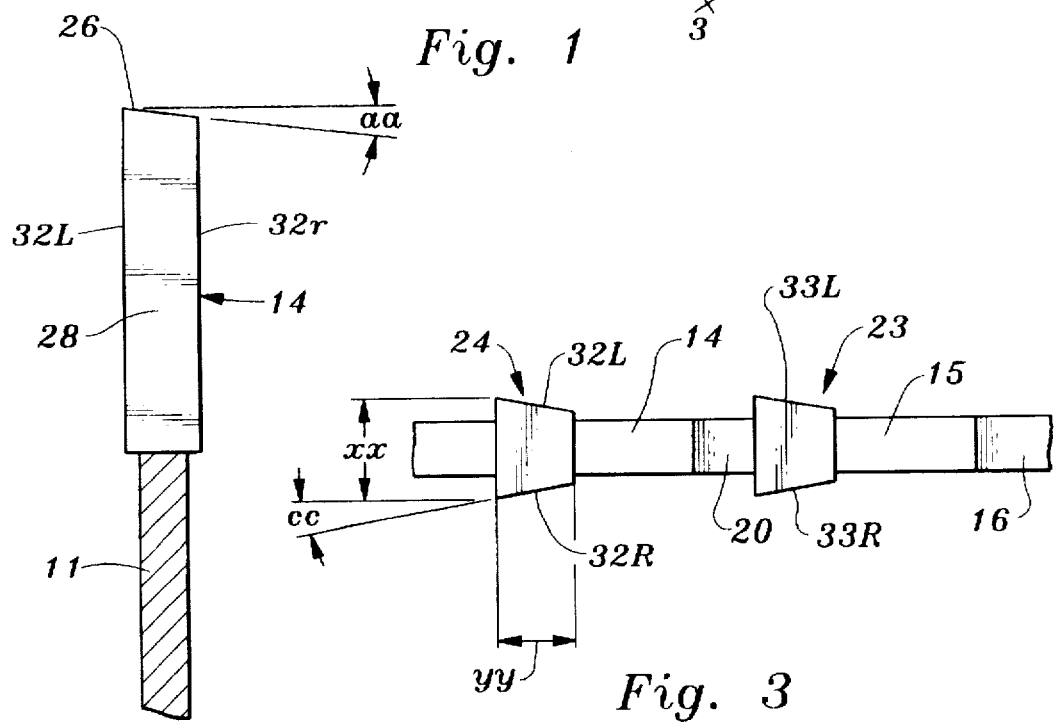
Fig. 2
Fig. 3

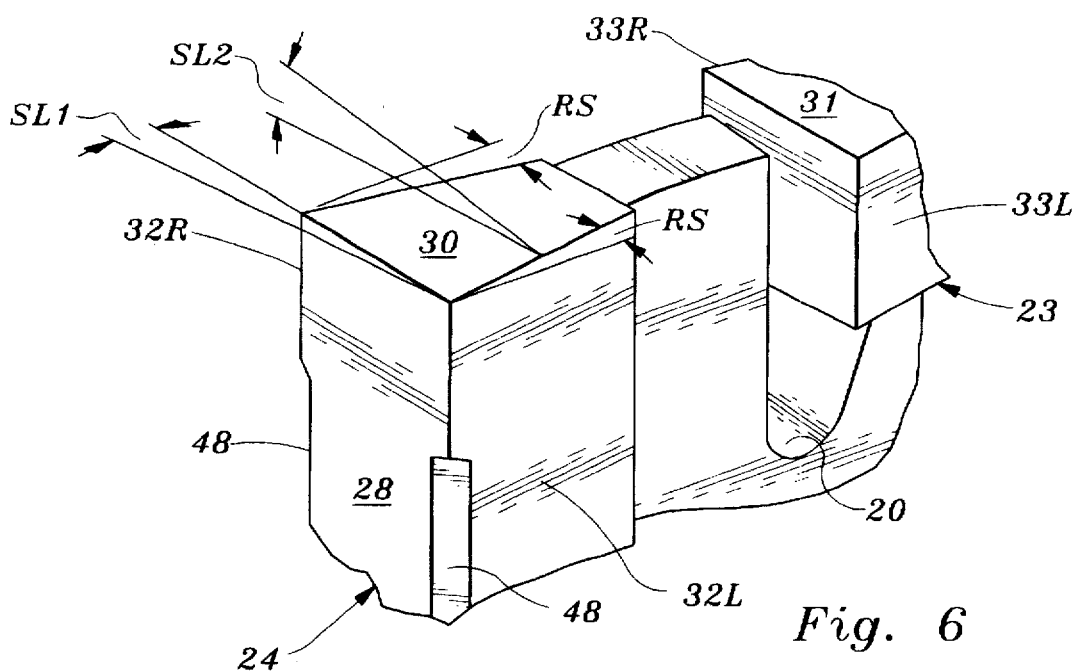
Fig. 6
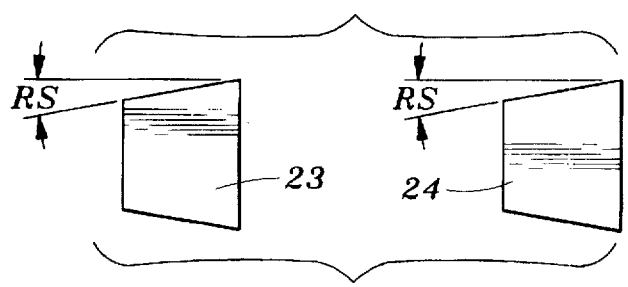
Fig. 7
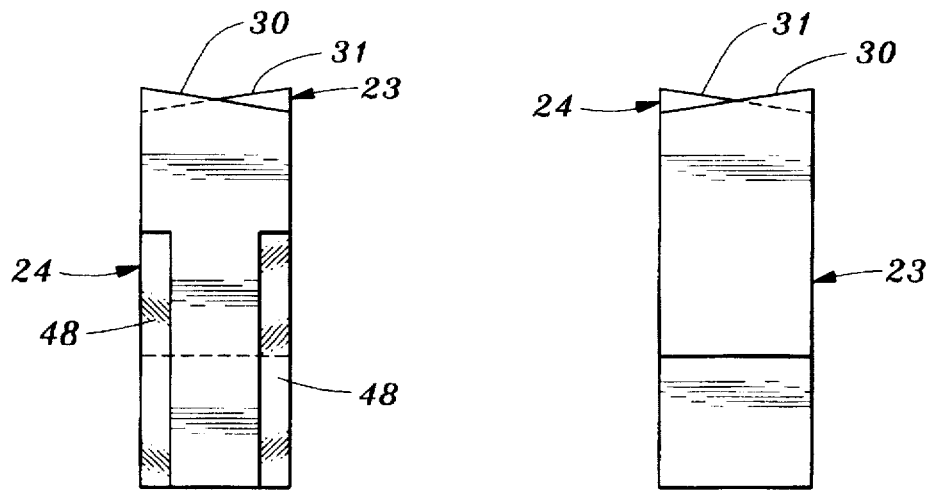
Fig. 8
Fig. 9

CLEAN CUTTING CIRCULAR SAW BLADE

FIELD OF THE INVENTION

This invention relates to saw blades for circular saws and table saws; and, more particularly, to an all-purpose saw blade having an improved cutting tooth pattern.

BACKGROUND OF THE INVENTION

DESCRIPTION OF THE PRIOR ART

Circular saws and circular saw blades are well known in the art since these saws are the most common power tool used by carpenters. The high wear resistance of carbide cutting teeth of such blades is also well known. It is known that tungsten carbide teeth inserts are tough and will stay keener longer than the teeth of an all-steel blade. However, the price of a single blade having carbide teeth can be very expensive. The problem is compounded by the fact that there are various types of blades with individual tooth styles suited for particular applications. Since it might be prohibitively expensive for the occasional user of such blades to have a different blade for each application, all-purpose blades have evolved.

Such all-purpose blades have cutting teeth which are a compromise between the optimum teeth required for a rip cut, and the teeth required for another application, such as a miter cut or crosscut.

It can be appreciated that, because of the characteristics of wood and the various ways to saw it, it is almost impossible to design the ultimate tooth shape for all applications. In the past there has been a clear difference between teeth shaped for crosscutting and those for ripping. For example, crosscut teeth would preferably have sharp side points that will sever wood fibers cleanly. Ripping teeth would have a flat top grind so each tooth will work like a tiny chisel to remove a comparatively large hunk of wood. A combination or all-purpose blade of the prior art thus may include both types of teeth in banks separated by deep waste-cleaning channels or gullets. However, such all-purpose blades may come close to doing the perfect job, i.e., producing burnished edges on crosscuts and miters, as well as clean rip cuts, burns on the wood and heavy blade wear may result. The all-purpose blades of the prior art have often been found to overly chip the wood, and not cut cleanly.

Since, as stated, carbide cuts better than steel, the details of the invention, to be recited here, will pertain equally to teeth inserts of tungsten carbide, which are mated to the blade body in a conventional manner, as well as to teeth ground in an all-steel blade. Thus the term tooth (teeth) will be utilized interchangeably with insert(s). The most conventional manner of attachment of teeth inserts to the plate or main body of the saw blade is by a technique known as silver soldering.

Accordingly, there is a need for a single all-purpose circular saw blade, preferably carbide toothed, that can perform a wide variety of cutting applications in differing types of wood and other media, such as veneers, vinyl sheeting, et cetera.

It is therefore an object of this invention to provide an improved all-purpose circular saw blade.

It is a further object of this invention to provide a circular saw blade having tungsten-carbide teeth inserts in sets of two cutting teeth, a ripper tooth, followed by a cleaner tooth, to produce clean cuts in most applications.

It is another object of this invention to provide a circular saw blade which cuts cleanly in both the rip cut and crosscut modes due to the presence of pairs of teeth having oppositely raked top surfaces.

It is a yet further object to provide a circular saw blade having pairs of spaced teeth, the space between them being unvarying no matter the diameter of the blade.

It is still another object of the invention to provide a saw blade wherein the teeth are disposed in spaced pairs around the periphery of the blade, a ripper tooth in front and a cleaner tooth behind with a recess or space, known as a gullet therebetween.

It is yet another object to provide a saw blade wherein the teeth are substantially similarly configured, though the top surfaces slant in opposite directions, and the front tooth of the pair is vertically longer than the trailer tooth.

It is a yet further object to provide a saw blade whose teeth are in a plurality of pairs, the front or ripper tooth of each pair preferably having chamfered edges on its front face edges.

It is an additional object to provide a saw blade having ripper teeth whose top surface slopes downwardly from left to right at a first angle and rearwardly at a second angle.

Other objects of the invention will in part be obvious and will in part appear hereinafter.

The invention accordingly comprises the device which possesses the features, properties and the relation of components which are exemplified in the following detailed disclosure and the scope of the application of which will be indicated in the appended claims.

For a fuller understanding of the nature and objects of the invention reference should be made to the following detailed description, taken in conjunction with the accompanying drawings.

BRIEF DESCRIPTION OF THE FIGURES

FIG. 1 is a side elevational view of a circular saw blade according to this invention;

FIG. 2 is a view taken along lines 2—2 of FIG. 1 and constitutes a front elevational view of a ripper tooth and the thickness of the mount plate, according to the invention.

FIG. 3 is a top plan view along lines 3—3 of the edge of a saw blade, specifically at a single pair of tooth inserts according to this invention.

FIG. 6 is a perspective view of a ripper tooth of this invention with a portion of its complementary cleaner tooth, and showing the chamfering aspect of the ripper tooth.

FIG. 7 is a top plan view of one pair of inserts for this invention in their relative disposition one behind the other, ripper on the right, cleaner on the left.

FIG. 8 is a front elevational view of a pair of aligned teeth according to this invention.

FIG. 9 is a rear elevational view of the aligned teeth depicted in FIG. 8.

SUMMARY OF THE INVENTION

Figure 4:
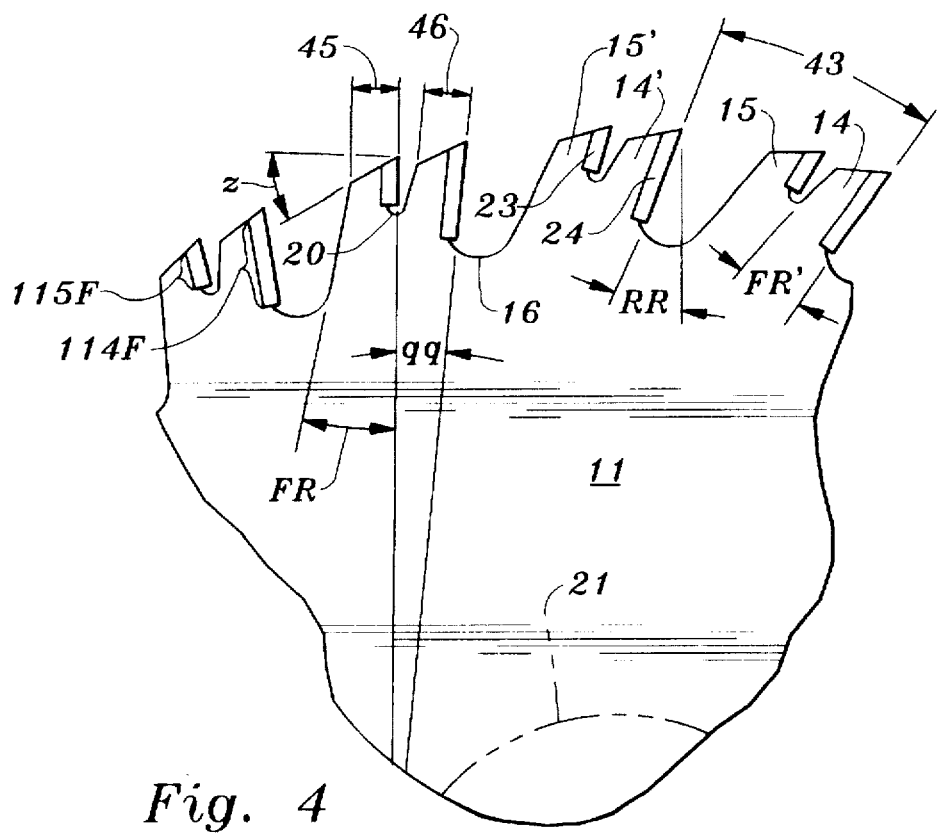
FIG. 4 is a detailed view of a portion of a blade having attached inserts and showing the relative angular relationships of the ripper and cleaner teeth.

The invention provides a circular saw blade, having a plurality of spaced sets of teeth, each set including a first forward ripper tooth and a second rearwardly disposed cleaner tooth. Each ripper tooth has an elevation greater than the elevation of its companion cleaner tooth. Each member of the pair has a complementary opposite slant along its respective top surface. The side surfaces of both the ripper tooth and the cleaner tooth taper rearwardly from the front surface to the rear surface such that the rear surface is narrower than the front surface. The pair (ripper+cutter) both have the same width or lateral extension along the front and rear surfaces. The left and right front surface edges of only the ripper tooth each have a chamfer commencing at a finite point down from the top surface thereof.

Each ripper tooth is preferably spaced about 15 degrees around the outer periphery of the blade and each cleaner tooth is spaced about 5 degrees behind the respective ripper tooth.

The actual elevation of any pair of teeth, i.e., one of each of ripper and cleaner, will vary with the workload being placed upon the teeth pair. The heavier the workload, the longer each tooth will be according to the pre-established relationship. With the tooth pattern set in this configuration, a single blade may be used as an all-purpose cutting blade to make clean cuts in various media without splintering.

DESCRIPTION OF THE PREFERRED EMBODIMENT

In the nomenclature of this patent application the words tooth and teeth will be intended to refer to both teeth that are ground into a steel main plate to form a blade, as well as to INSERT(S), which are mounted to a tooth shaft as by conventional silver soldering techniques. The text will be so recited, since (1) the use of inserts is very well known in the art, and (2) the configuration of the insert would be the same as that of a tooth. Therefore a duplication of the description of both is avoided.

Referring now to FIG. 1 of the drawing, the improved circular saw blade 10 includes a flat circular plate 11 having a centrally located aperture 12 for securing the blade 10 to a shaft of the saw, (not seen) and a plurality of teeth in sets of two, disposed around the outer periphery of the circular plate, 11. Thus, as seen in FIG. 1, there are preferably twenty four sets, each pair being designated 13, spaced uniformly about the outer periphery of plate 11, each set consisting of a pair of teeth. These teeth sets 13, comprise the cutting elements and include a first forward ripper tooth 14 followed by a second or trailer cleaner tooth 15. Each set of teeth 13 is comprised of one each of tooth 14, and tooth 15 with a recess, i.e., a small gullet, designated a first gullet, 20 therebetween. Each set of teeth 13, is separated from the next set of teeth by a large gullet 16 designated as a second gullet.

As noted earlier, each tooth may be formed directly in steel on the main plate or preferably a tooth insert which is made of tungsten carbide or a similar hardness material so configured is silver soldered or otherwise applied to tooth shafts adapted to received the inserts. Thus each tooth is also preferably seen to comprise a shaft to which is attached a front insert usually made of tungsten carbide or other hardening material which presents a more long wearing cutting face than does an all steel tooth. Thus reference is made to FIG. 4 wherein a saw blade having inserts is depicted. These inserts are designated 23 for the cleaner tooth 15' and 24 for the ripper tooth 14'. In this FIG. 4, designations 114 and 115 (not shown) are employed for the respective ripper and cleaner tooth shafts to which the inserts 24 and 23 are attached to form the teeth 14' and 15' respectively.

Like numbers will refer to like parts for steel formed teeth as well as for inserts to be attached. Therefore the large and small gullets remain like numbered.

As seen in FIG. 1, each ripper tooth 14 is appreciably longer than the cleaner tooth. For example, plate 11 may be 10 inches in diameter with ripper teeth 14 spaced every 15 degrees around the outer periphery of plate 11, while the cleaner teeth 15 are spaced 5 degrees behind the ripper teeth 14. Each ripper tooth 14 (FIG. 2) may be about ⅝ inches in length, with each cleaner tooth 15 being about 9/16 inches in length. Of course, these dimensions may vary according to the size of blade, i.e., its overall diameter. Saw blades encompassing this invention may be made from about 5" to about 16" in diameter.

FIG. 2 is basically a front view of a portion of the main plate 11 and a single ripper tooth 14. As seen in FIG. 2, the upper or top surface 26 of each tooth 14 (and its respective insert tip 24 if present), possesses a top bevel angle "aa" of preferably about 7½ degrees from the horizontal. The top bevel angle of tooth 15 (and its respective insert 23,) is at a similar angle but canted in the opposite direction. See FIGS. 8 & 9. Both top bevel angles can vary up to about a 10 degree angle.

The tooth 14 has a front surface 28, and left and right side surfaces 32L and 32R respectively, which are also seen in this figure. The rearward sweep inwardly from front to rear of each tooth (insert) is not discernible from the front view of FIG. 2 but will be discussed with respect to FIG. 3.

Reference is now made to FIGS. 3 and 4, which depict a set or pair 13' of teeth 14', 15' each of which has a front insert; namely, 24 and 23 respectively attached to a respective shaft 114 and 115. When no inserts are employed the teeth per se are generally no wider than the thickness of the plate 11. It is seen in these figures where inserts are shown, that the inserts are each a bit wider than the thickness of plate 11. Insert 24 for the ripper tooth 14' has left and right side surfaces 32L and 32R, which both taper rearwardly.

In this invention as in any other invention pertaining to a saw tooth with pairs of teeth, there are seen to exist an intricate series of spatial relationships between the two respective teeth of the pair and the plate 11 of the saw blade 10. Some of these have already been discussed.

All numeric dimensions recited, (as opposed to numbers used for parts identification) are based upon a 10" diameter blade, which is a common diameter dimension in the circular saw industry. Other saw blades having diameters ranging between 5" and 18" or even more are contemplated by this invention.

As also seen in FIG. 3, the width "xx" of each inserts 24, 23 of teeth 14, 15 may be about 0.125 inches and side faces 32L, 32R of the respective inserts may each make an angle "cc" to the horizontal of about 3 degrees. The depth "yy" of each of the two inserts is the same; namely, about 3/32 inches.

Reference is also made to the front view FIG. 8 showing the aligned inserts from the front, and to FIG. 9 which shows the aligned pair as seen from the rear. Discussion infra.

As mentioned earlier, the same part numbers will be used to designate surfaces and angles and relationship for teeth of steel formed directly in plate 11 as well as for carbide inserts which are soldered to shafts 114 and 115 to receive same respectively on their respective faces 114F and 115F.

Reference should now be made to the side elevational view, FIG. 4. Here it is seen that the rake angle, i.e., the angle formed by the incline of the front of the insert relative to the vertical, and designated "RR" on the right side of FIG. 4 is 15 degrees for both teeth of a set. It is also seen that the rake angle is in a different angular direction on each set of two teeth around the periphery of the blade.

Figure 5:
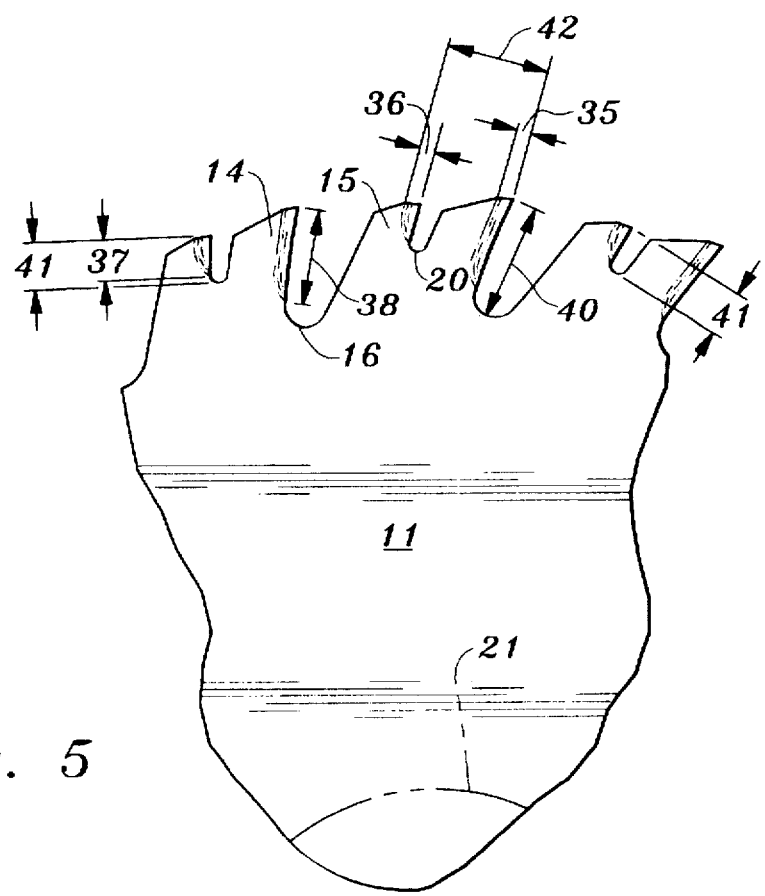
FIG. 5 is a detailed view of a portion of the blade of FIG. 1, i.e., no inserts, showing various angular relationships between the two members of any pair of teeth and the mount plate, according to the invention.
Figure 10:
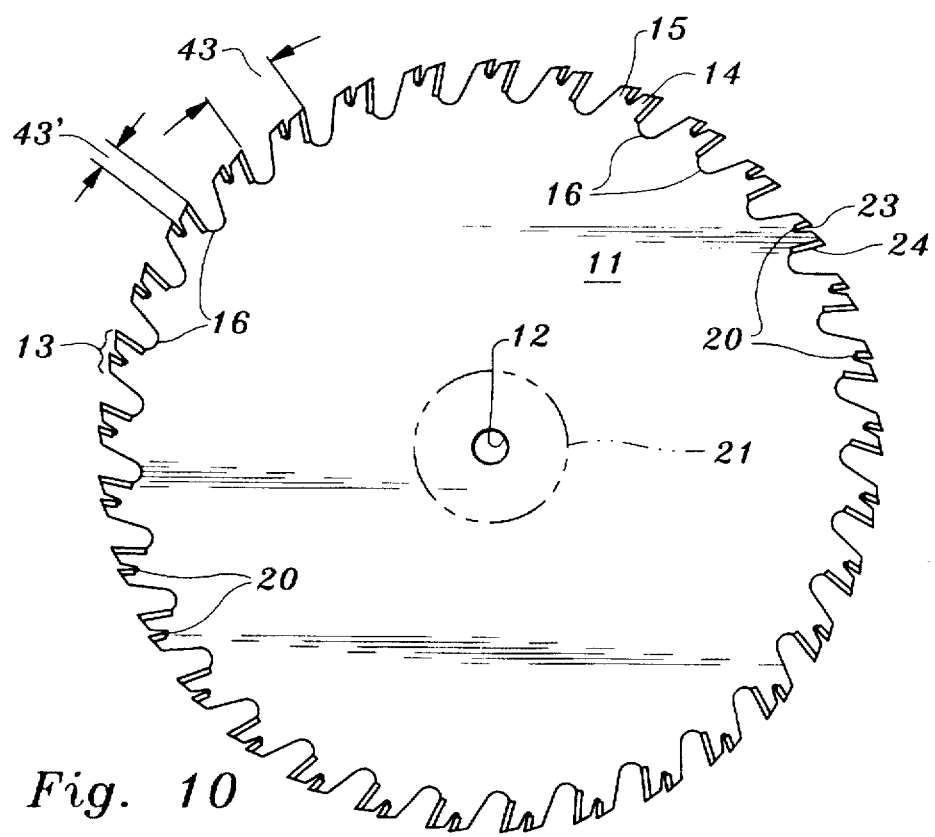
FIGS. 10 and 11 are plan views of a 14–33 tooth saw blade and an 18" 43 tooth saw blade according to the invention, respectively.
Figure 11:
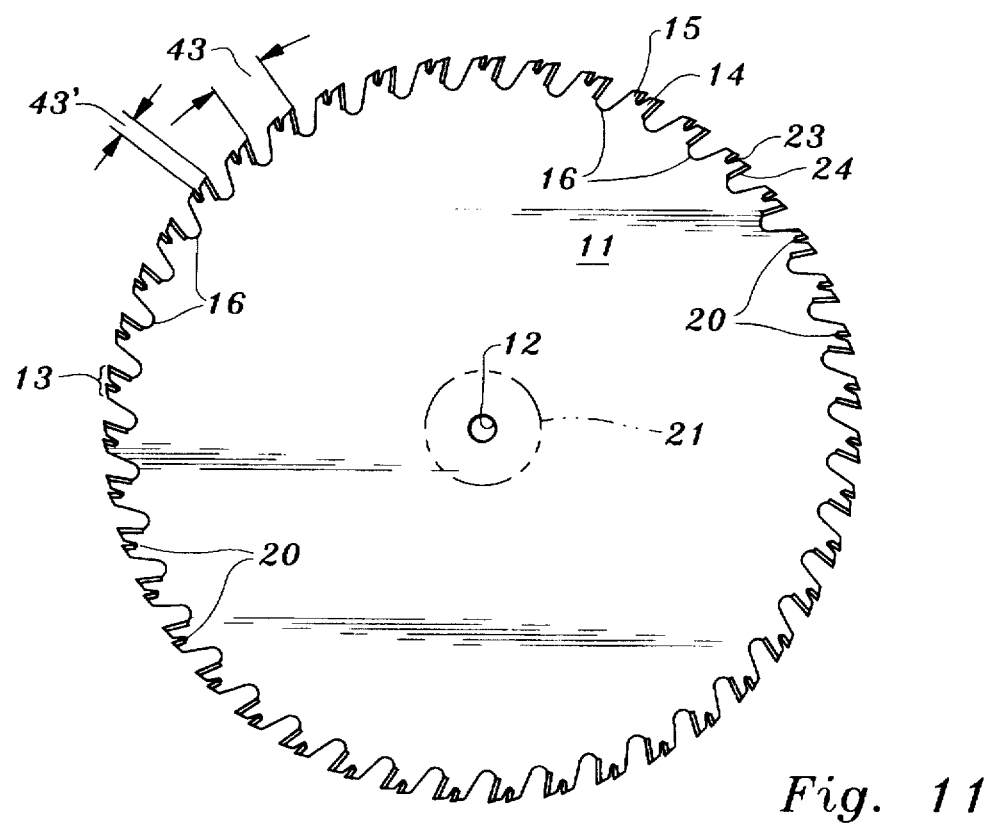

Reference is now made to FIG. 5 which is a view of a steel blade. Reference should also be made as well as to FIGS. 3 and 4. As seen in FIG. 5, the two tip thicknesses 35 and 36 respectively are the same for both the ripper tooth 14 and cleaner tooth 15.

Also from FIG. 5 it can be readily seen that the tip length 38 of the ripper tooth 14 is greater than the tip length 37, of the cleaner tooth 15. The ratio of ripper insert's tip length 38 to cleaner insert tip length 37, is about 2 to 1. Dimensionally this works out to a tip length 38 of about ⅝ths inch while tip length 37 of the cleaner tooth 15 is about 5/16ths inch.

The height 40, of the gullet 16, is seen to be about ⅛-inch greater than the tip length 38 of the ripper insert, while the height of the recess 41 between the two teeth of the pair is about ⅛-inch greater than the tip length, 37 of the cleaner tooth 15 in a 10-inch diameter blade. Recess 41 may be about 23/64ths inch.

The "pitch" is defined in the industry as the distance between the leading edge of two adjacent teeth. Here, the pitch, which is designated 42, between the leading edge of a front ripper 14 and its companion cleaner 15, is about 7/16 inch; while the pitch 43, seen in FIGS. 1 & 4 between a ripper/cleaner and the next adjacent ripper/cleaner set of teeth is about 1.343 inches.

It is to be noted, that to ensure best results with a no insert blade such as is shown in FIG. 5, the section of the blade just below the gullet 20, should be of reduced thickness.

The chord length 43' per FIG. 1,—as opposed to the pitch 43,—of each tooth 14, and 15 is about 0.443 inches. It is to be pointed out specifically that the pitch and the chord length 43' are constants, no matter the diameter of the blade and the number of teeth on the blade.

The FR angle, also per FIG. 4 which is the slope of the front face of a tooth versus the slope of the rear face of a tenth, here the cleaner tooth is about 15 degrees and the same defined angle for the ripper tooth is designated FR' is about 10 degrees. The FR angle helps to define the physical configuration of the pair of teeth.

Reference is again made to FIG. 4. The dimension (from front to rear of a tooth) is designated the depth, i.e., depth 45 of each tooth 15 and the depth 46 of each tooth 14, since the cutting surface of each saw tooth is considered to be the front of the tooth. This is another dimension that remains constant no matter the size of the blade. The depth of each of the ripper teeth, 46, is about ¼ inch, while the depth for each cleaner tooth 45 is about 5/16th inch, such that the cleaner is actually a little deeper dimensionally.

The angular relationship "z" for the rearward and downward slope of each tooth 14 and the complementary angle "z'" for the rearward downward slope of each tooth 15 is the same; namely, about 30 degrees. These slopes are designated in the trade as the top back clearance angles.

The radius of each gullet 16 is about ⅛ inch whereas the radius of each gullet 20 separating tooth 14 from tooth 15 is about ⅜ths inch radius.

Another relationship to be considered in defining the configuration of the pair of teeth of a set according to this invention is the relative inclination of the front face of the ripper tooth, to the inclination of its associated cleaner tooth around the periphery of the blade. In FIG. 4 it is seen that this angle is designated "qq" and is about 10 degrees.

Yet another angle (not shown) used to help define the characteristics of the saw blade is the tooth facial angle.

Here for the cleaner tooth, the angle formed between the front face of the tooth or insert, and the rear angle thereof is also 10 degrees.

Reference is now made to the spaced inserts 14' and 15' shown unattached, for ease of understanding and the diminution of clutter, as seen in FIG. 7. The slight rearward taper or slant of the side walls 32L & R and 33L & R inwardly is designated angle RS and is seen in FIG. 6 as well. This taper is preferably about 3 degrees. FIG. 6 also shows three dimensionally the relative close-up spatial relationship between the front ripper insert 24 and its neighbor cleaner insert 23 (shown only in part) with a small gullet 20 therebetween.

The slope angles of the respective top surfaces 30, 31 of the two teeth (or the two inserts) are designated SL1 and SL2 per FIG. 8 and are the same angle; namely, 30 degrees. See also FIG. 9. It is seen that the top surface is slanted or raked from right to left in one tooth and oppositely in the second tooth of the set at about 7.5°, no matter the diameter of the plate, i.e., the number of tooth sets present.

In the more preferred version, the two teeth of the tooth set also have their respective top surfaces slanted or raked rearwardly as well. Thus the top surface of each riper and each cleaner tooth would be subjected to a compound angle. The rearward slant is preferably about 30°.

In FIG. 8, the front view of the preferred version of the ripper tooth in alignment with its cleaner, a chamfer 48 is shown at the interface of the front and side surfaces of the ripper tooth. This chamfer, when employed, extends upwardly from the bottom front of the insert. The chamfer's commencement point is measured downwardly from the top edge of the higher side edge of the ripper's front face and commences at a point about 0.200 inches down from the said top edge, to the bottom of the longer side edge and an equal amount on each ripper tooth's shorter side edge measured up from the bottom surface.

As seen in FIG. 1, is aperture 12 for mounting the blade 10 to the shaft of the saw. The circular section 21 is often of a lesser thickness than that of plate 11 for balancing purposes and is used to help seat the blade for use. The circular section or hub 21 has a radius of about 1.375 inches for a 10-inch diameter blade. The two lines nn and ll lie tangent to the hub, and one of them is aligned with each successive tooth 14 to define an angle of about 15 degrees whereas line ll and line mm, also tangent to hub 21 and aligned with tooth 15 as shown, define an angle of about 5 degrees. Such dimensions and angles further help to define the blade of this invention. While the dimensions may vary for larger and smaller diameter blades, the angular relationships will remain the same.

The carbide tips or inserts, if employed, may be cemented tungsten carbide which is an alloy of powdered tungsten and carbon permanently bonded under high temperatures and extreme pressures, and which is classically known in the art. Such material is tough and may be as much as 94 percent tungsten carbide with a binder, such as cobalt powder. Such carbide faced tips are well known in the art.

The spacing between teeth 14, and 15 and teeth 14' and 15' with inserts will NOT vary nor will the spacing between a rear tooth 15 and the next rearward ripper tooth 14 within the scope of this invention. Therefore as the diameter of the blade increases or decreases, the count or number of teeth pairs will increase or decrease.

While the exact overall length of each tooth or insert may vary, the inserts of each ripper tooth 14' and each ripper tooth 14 will always be longer than the length of the inserts of each tooth 15' and each cleaner tooth 15, within the basic configuration of this invention. The plate 11 may be of varying diameters as has been discussed earlier.

It can be seen that there is disclosed a saw blade which can make a clean miter or rip cross cut without splintering. Thus, the blade of this invention may be used as an all-purpose blade, with little if any sanding being required of the edges of cut materials. Such a saw blade will last longer and stay sharper longer than a conventional saw.

The saw blade of this invention will cut wood and other media such as plastic, vinyl and veneer faster without dragging down, and cleaner with a smoother cut than prior art saw blades. Thus, planing is eliminated and much savings in labor results. As is discussed in the section of this application dealing with testing, the tooth arrangement of this invention, cuts wood curls rather than wood chips.

The blade will cut vinyl sheet without chipping and as such acts to lower the cost of cutting such materials due to the long life of the blade.

The teeth of this invention while discussed above pertinent to a 10-inch diameter blade for a table saw, can be made relatively shorter to fit a 7-inch or 8-inch diameter of a Skill™ saw and longer than recited to fit even up to a 20 inch in diameter blade for professional table and arbor saws. In these different diameter blades, fewer teeth or more teeth may be present than in the 10-inch diameter blade, but they are of the same size but for elevation, as recited hereinabove.

TESTING PROGRAM

The tests to be discussed herein were made with a 10-inch diameter saw blade prepared in accordance with the disclosure of this invention. A steel plate was outfitted with tungsten carbide inserts spaced at intervals in pairs around the periphery of the plate in the numbers previously indicated dependent on the diameter of the plate.

It was found that when the blade having the tooth arrangement of this invention is used as a rip saw, it will cut curls rather than chip out the wood as is common in the prior art.

In addition as noted earlier, the blade of this invention is an all purpose blade and will carry out superior crosscutting of wood and other materials, compared to the prior art.

In conclusion it is seen that we have provided a most unique saw blade for a circular saw. One that can be used as an all-purpose blade for both crosscutting and for ripping. The cleanliness of the cuts of this saw blade may be attributed to the unique configuration of the ripper tooth and the cleaner tooth found herein. It is seen that the unique configuration of the two teeth forming a tooth set according to this invention is applicable to both tooth sets formed directly in steel, as well as for tooth inserts that are attached to tooth shafts by means well known in the art.

Since certain changes may be made in the above apparatus without departing from the scope of the invention herein involved, it is intended that all matter contained in the above description and shown in the accompanying drawings shall be interpreted as illustrative and not in a limiting sense.

We claim:

1. An improved circular saw blade having a centrally apertured plate and a series of two tooth sets disposed around an outer periphery of the plate, each set being separated by a first gullet, each of the tooth sets comprising:

a forward ripper tooth and a rearward cleaner tooth, the two teeth of the set being separated by a second gullet therebetween, said second gullet being smaller than the first gullet;

wherein each of said teeth has a front surface, a rear surface, a top surface, and two side surfaces, and each of said side surfaces tapers rearwardly inwardly at an angle between the front and rear surfaces, and wherein the top surface of each of the two teeth of the tooth set has an equal and opposite downward lateral rake and in addition each top surface of the ripper tooth is slanted downwardly from the front surface toward the rear surface thereof, and each ripper tooth has a chamfer at the intersection of the front surface with each of the side surfaces;

wherein the lateral rake is about a 7.5 degree angle and the rearward taper of the top surface is about a 30 degree angle;

wherein each of said side surfaces tapers rearwardly inwardly at an angle of about 3 degrees between the front and rear surfaces;

wherein the front surface of the ripper tooth is vertically longer than the front surface of the cleaner tooth;

wherein each ripper tooth is spaced about every 15 degrees around the outer periphery of said plate;

wherein said plate is within a range of 10–18 inches in diameter and has tooth sets in a range of 33–43 tooth sets;

wherein the cutting tip of each of said ripper teeth is about ⅝ inches long and the cutting tip of each of said cleaner teeth is about ⁵⁄₁₆ inches long;

wherein a length of each of said teeth along the upper surfaces thereof in a direction parallel to the outer periphery of said plate is about ⁹⁄₃₂ inches.

2. In the saw blade of claim 1 further including chamfers on both side surface of the front surface of each ripper tooth.

3. In the saw blade of claim 1 wherein said plate is about 10 inches in diameter.

4. In the saw blade of claim 1 further wherein each of the teeth of each pair of teeth comprises a tooth shaft to which is secured a tooth insert.

5. In the saw blade of claim 1 wherein the plate is about 14" in diameter and has 33 tooth sets.

6. In the saw blade of claim 1 wherein the plate is about 18" in diameter and has 43 tooth sets.

* * * * *

UNITED STATES PATENT AND TRADEMARK OFFICE
CERTIFICATE OF CORRECTION

PATENT NO.    : 5,743,163
DATED         : April 28, 1998
INVENTOR(S)   : Edward E. Lavinder It is certified that error appears in the above-identified patent and that said Letters Patent is hereby corrected as shown below:

Column 8,
Lines 35-37, should read -- Wherein said plate is within a range of 10-18 inches in diameter and has tooth sets in a range of 24-43 tooth sets; --
Lines 51 and 52, should read -- In the saw blade of claim 1 wherein the plate is about 10" in diameter and has 24 tooth sets. --

Signed and Sealed this

Thirtieth Day of July, 2002

Attest:

Attesting Officer

JAMES E. ROGAN
Director of the United States Patent and Trademark Office